US009465732B2

(12) United States Patent
Manohar et al.

(10) Patent No.: US 9,465,732 B2
(45) Date of Patent: Oct. 11, 2016

(54) BINNING OF BLOCKS FOR DYNAMIC LINKING

(71) Applicant: SanDisk Technologies Inc., Plano, TX (US)

(72) Inventors: Abhijeet Manohar, Bangalore (IN); Chris Nga Yee Avila, Saratoga, CA (US)

(73) Assignee: SanDisk Technologies LLC, Plano, TX (US)

( * ) Notice: Subject to any disclaimer, the term of this patent is extended or adjusted under 35 U.S.C. 154(b) by 411 days.

(21) Appl. No.: 13/855,542

(22) Filed: Apr. 2, 2013

(65) Prior Publication Data

US 2014/0281141 A1 Sep. 18, 2014

Related U.S. Application Data

(60) Provisional application No. 61/793,708, filed on Mar. 15, 2013.

(51) Int. Cl.
*G06F 12/02* (2006.01)

(52) U.S. Cl.
CPC ... *G06F 12/0246* (2013.01); *G06F 2212/7206* (2013.01); *G06F 2212/7208* (2013.01); *G06F 2212/7211* (2013.01)

(58) Field of Classification Search
CPC .............. G06F 12/0246; G06F 2212/7208; G06F 2212/7211; G06F 2212/7206
USPC ................................................. 711/103, 168
See application file for complete search history.

(56) References Cited

U.S. PATENT DOCUMENTS

| 5,768,192 | A | 6/1998 | Eitan |
| 5,798,968 | A | 8/1998 | Lee et al. |
| 5,890,192 | A | 3/1999 | Lee et al. |
| 6,011,725 | A | 1/2000 | Eitan |
| 7,433,993 | B2 | 10/2008 | Sinclair |
| 2004/0083335 | A1* | 4/2004 | Gonzalez ............ G06F 12/0246 711/103 |

(Continued)

FOREIGN PATENT DOCUMENTS

| WO | WO02058074 | 7/2002 |
| WO | WO2005066770 | 7/2005 |
| WO | WO2008082950 | 7/2008 |

OTHER PUBLICATIONS

Super Talent Technology, Inc., "SLC vs. MLC: An Analysis of Flash Memory", Jan. 5, 2012. Retrieved on Oct. 19, 2015 from <https://web.archive.org/web/20120615000000*/http://www.supertalent.com/datasheets/SLC_vs_MLC%20whitepaper.pdf>.*

(Continued)

*Primary Examiner* — Arpan P. Savla
(74) *Attorney, Agent, or Firm* — Davis Wright Tremaine LLP

(57) ABSTRACT

A multi-plane non-volatile memory die includes circuits that receive and apply different parameters to different planes while accessing planes in parallel so that different erase blocks are accessed using individualized parameters. Programming parameters, and read parameters can be modified on a block-by-block basis with modification based on the number of write-erase cycles or other factors.

16 Claims, 7 Drawing Sheets

(56) References Cited

U.S. PATENT DOCUMENTS

| | | | |
|---|---|---|---|
| 2005/0144357 A1* | 6/2005 | Sinclair | G06F 12/0246 711/103 |
| 2005/0144361 A1 | 6/2005 | Gonzalez et al. | |
| 2006/0106972 A1* | 5/2006 | Gorobets | G06F 12/0246 711/103 |
| 2009/0070518 A1 | 3/2009 | Traister et al. | |
| 2009/0089482 A1 | 4/2009 | Traister | |
| 2010/0228928 A1 | 9/2010 | Anaashari et al. | |
| 2012/0303931 A1 | 11/2012 | Anaashari | |

OTHER PUBLICATIONS

Eitan et al., "NROM: A Novel Localized Trapping, 2-Bit Nonvolatile Memory Cell," IEEE Electron Device Letters, vol. 21, No. 11, Nov. 2000, pp. 543-545.

U.S. Appl. No. 13/741,252, filed Jan. 14, 2013, entitled "Dynamic Block Linking with Individually Configured Plane Parameters," 25 pages.

Technical Search Report, Nov. 20, 2012, 7 pages.

\* cited by examiner

| Bin # | Hot Ct. | Parameters | |
|---|---|---|---|
| 1 | 0-A | Set 1 | |
| 2 | A-B | Set 2 | |
| 3 | B-C | Set 3 | |
| ... | ... | | |

BINNING OF BLOCKS FOR DYNAMIC LINKING

CROSS REFERENCE TO RELATED APPLICATIONS

This application claims the benefit of Provisional Patent application No. 61/793,708, filed on Mar. 15, 2013, which is hereby incorporated by reference in its entirety.

BACKGROUND

This application relates to the operation of re-programmable nonvolatile memory systems such as semiconductor flash memory systems, and, more specifically, to operation of multiple planes in such systems.

Solid-state memory capable of nonvolatile storage of charge, particularly in the form of EEPROM and flash EEPROM packaged as a small form factor card, has recently become the storage of choice in a variety of mobile and handheld devices, notably information appliances and consumer electronics products. Unlike RAM (random access memory) that is also solid-state memory, flash memory is non-volatile, and retains its stored data even after power is turned off. Also, unlike ROM (read only memory), flash memory is rewritable similar to a disk storage device. In spite of the higher cost, flash memory is increasingly being used in mass storage applications. Conventional mass storage, based on rotating magnetic media such as hard drives and floppy disks, is unsuitable for the mobile and handheld environment. This is because disk drives tend to be bulky, are prone to mechanical failure and have high latency and high power requirements. These undesirable attributes make disk-based storage impractical in most mobile and portable applications. On the other hand, flash memory, both embedded and in the form of a removable card is ideally suited in the mobile and handheld environment because of its small size, low power consumption, high speed and high reliability features.

Flash EEPROM is similar to EEPROM (electrically erasable and programmable read-only memory) in that it is a non-volatile memory that can be erased and have new data written or "programmed" into their memory cells. Both utilize a floating (unconnected) conductive gate, in a field effect transistor structure, positioned over a channel region in a semiconductor substrate, between source and drain regions. A control gate is then provided over the floating gate. The threshold voltage characteristic of the transistor is controlled by the amount of charge that is retained on the floating gate. That is, for a given level of charge on the floating gate, there is a corresponding voltage (threshold) that must be applied to the control gate before the transistor is turned "on" to permit conduction between its source and drain regions. In particular, flash memory such as Flash EEPROM allows entire blocks of memory cells to be erased at the same time.

Nonvolatile memory devices are also manufactured from memory cells with a dielectric layer for storing charge. Instead of the conductive floating gate elements described earlier, a dielectric layer is used. Such memory devices utilizing dielectric storage element have been described by Eitan et al., "NROM: A Novel Localized Trapping, 2-Bit Nonvolatile Memory Cell," IEEE Electron Device Letters, vol. 21, no. 11, November 2000, pp. 543-545. An ONO dielectric layer extends across the channel between source and drain diffusions. The charge for one data bit is localized in the dielectric layer adjacent to the drain, and the charge for the other data bit is localized in the dielectric layer adjacent to the source. For example, U.S. Pat. Nos. 5,768,192 and 6,011,725 disclose a nonvolatile memory cell having a trapping dielectric sandwiched between two silicon dioxide layers. Multi-state data storage is implemented by separately reading the binary states of the spatially separated charge storage regions within the dielectric.

Memory cells of a typical flash EEPROM array are divided into discrete blocks of cells that are erased together. That is, the erase block is the erase unit, a minimum number of cells that are simultaneously erasable. Each erase block typically stores one or more pages of data, the page being the minimum unit of programming and reading, although more than one page may be programmed or read in parallel in different sub-arrays or planes. Each page typically stores one or more sectors of data, the size of the sector being defined by the host system. An example sector includes 512 bytes of user data, following a standard established with magnetic disk drives, plus some number of bytes of overhead information about the user data and/or the erase block in which they are stored.

In order to increase the degree of parallelism during programming user data into the memory array and read user data from it, the array is typically divided into sub-arrays, commonly referred to as planes, which contain their own data registers and other circuits to allow parallel operation such that sectors of data may be programmed to or read from each of several or all the planes simultaneously. An array on a single integrated circuit may be physically divided into planes, or each plane may be formed from a separate one or more integrated circuit chips. Examples of such a memory implementation are described in U.S. Pat. Nos. 5,798,968 and 5,890,192.

To further efficiently manage the memory, erase blocks may be linked together to form virtual blocks or metablocks. That is, each metablock is defined to include one erase block from each plane. Use of the metablock is described in international patent application publication no. WO 02/058074. The metablock is identified by a host logical block address as a destination for programming and reading data. Similarly, all erase blocks of a metablock are erased together. The controller in a memory system operated with such large blocks and/or metablocks performs a number of functions including the translation between logical block addresses (LBAs) received from a host, and physical block numbers (PBNs) within the memory cell array. Individual pages within the blocks are typically identified by offsets within the block address. Address translation often involves use of intermediate terms of a logical block number (LBN) and logical page.

In some cases, adaptive metablocks may link a variable number of erase blocks in an adaptive manner so that different blocks, in different planes, are linked together at different times. Examples of such adaptive metablocks are provided in U.S. Pat. No. 7,433,993.

In general, it is desirable to allow access to a number of erase blocks in different planes in parallel in a flexible manner, for example, to form adaptive metablocks. It is also desirable to maintain high speeds for such access.

SUMMARY

According to a general aspect of the invention, erase blocks are categorized (or binned) into different categories according to their respective write erase cycle counts. Access parameters for memory access, such as read, write, and erase voltages, are different for different for blocks in different categories. In this way, parameters are adaptive to the level of wear of the erase blocks. When linking erase blocks for parallel operation, erase blocks are selected from different planes, and/or different dies, so that linked blocks are all from the same category. This means that they can all be accessed using the same parameters so that separate loading of parameters is not necessary. Parameters may be broadcast to all planes and then data may be loaded and programmed across all planes in parallel.

An example method of operating erase blocks of a memory array in parallel includes: maintaining individual write-erase cycle counts for erase blocks of a block-erasable flash memory array; categorizing the erase blocks into a plurality of categories according to their write-erase cycle counts, erase blocks in a category having write-erase cycle counts within a predetermined range; selecting individual erase blocks in different planes for parallel operation in a metablock such that each erase block in the metablock is selected from a common category; and operating the metablock using a common set of parameters that is applied to all erase blocks of the metablock, the common set of parameters determined by the common category, with each category of the plurality of categories having a different set of parameters.

The common set of parameters may include a programming voltage applied to a word line during programming. The common set of parameters may include a number of pulses of a programming voltage applied during programming. The common set of parameters may include a read voltage applied to a word line during reading. The individual erase blocks may be selected from different planes in different dies. The common set of parameters may be broadcast to all of the different dies prior to accessing the metablock. The memory array may be a Single-Level Cell (SLC) memory array and the predetermined range of write-erase cycle counts for a category may be less than ten thousand. The memory array may be a Multi-Level Cell (MLC) memory array and the predetermined range of write-erase cycle counts for a category may be less than two thousand.

An example of a multi-plane flash memory includes: a plurality of nonvolatile memory cells arranged in a plurality of planes, a plane comprising a plurality of erase blocks; a write-erase cycle count circuit that maintains an individual write-erase cycle count for individual erase blocks of each plane and categorizes the erase blocks into categories according to their write-erase cycle count; a linking circuit that links two or more erase blocks in two or more of the plurality of planes so that the two or more erase blocks that are linked together are from the same category; and a memory access circuit that accesses the two or more erase blocks in parallel using a common set of parameters for all of the two or more erase blocks, the common set of parameters associated with the category.

The common set of parameters may include a programming voltage used during programming and a read voltage used during reading. The multi-plane flash memory may include a plurality of lists of erase blocks, each list containing entries corresponding to the erase blocks of one of the categories. The plurality of nonvolatile memory cells may be on a first chip and the write-erase cycle count circuit and the linking circuit are on a separate second chip. The plurality of nonvolatile memory cells may be on a plurality of memory chips and the write erase cycle count circuit and the linking circuit are on a memory controller chip.

An example of a method of operating a flash memory array includes: maintaining historical usage information for individual erase blocks in each of two or more dies of the memory array; dividing erase blocks into a plurality of classes according to their respective historical usage information so that erase blocks with similar levels of wear are classed together; operating the flash memory array using a plurality of different sets of memory access parameters, each set of memory access parameters associated with one of the classes; linking two or more individual erase blocks from different planes of the two or more dies for parallel operation as a metablock, all of the two or more individual erase blocks chosen from a selected class; and accessing the metablock using the set of memory access parameters associated with the selected class.

The selected class may be selected as a result of containing erase blocks in each of the two or more dies, and containing erase blocks with less wear than any other class that also contains erase blocks in each of the two or more dies. The historical usage information may include both write-erase cycle information and read cycle information.

Various aspects, advantages, features and embodiments of the present invention are included in the following description of exemplary examples thereof, which description should be taken in conjunction with the accompanying drawings. All patents, patent applications, articles, other publications, documents and things referenced herein are hereby incorporated herein by this reference in their entirety for all purposes. To the extent of any inconsistency or conflict in the definition or use of terms between any of the incorporated publications, documents or things and the present application, those of the present application shall prevail.

DETAILED DESCRIPTION

Memory System

Figure 1:
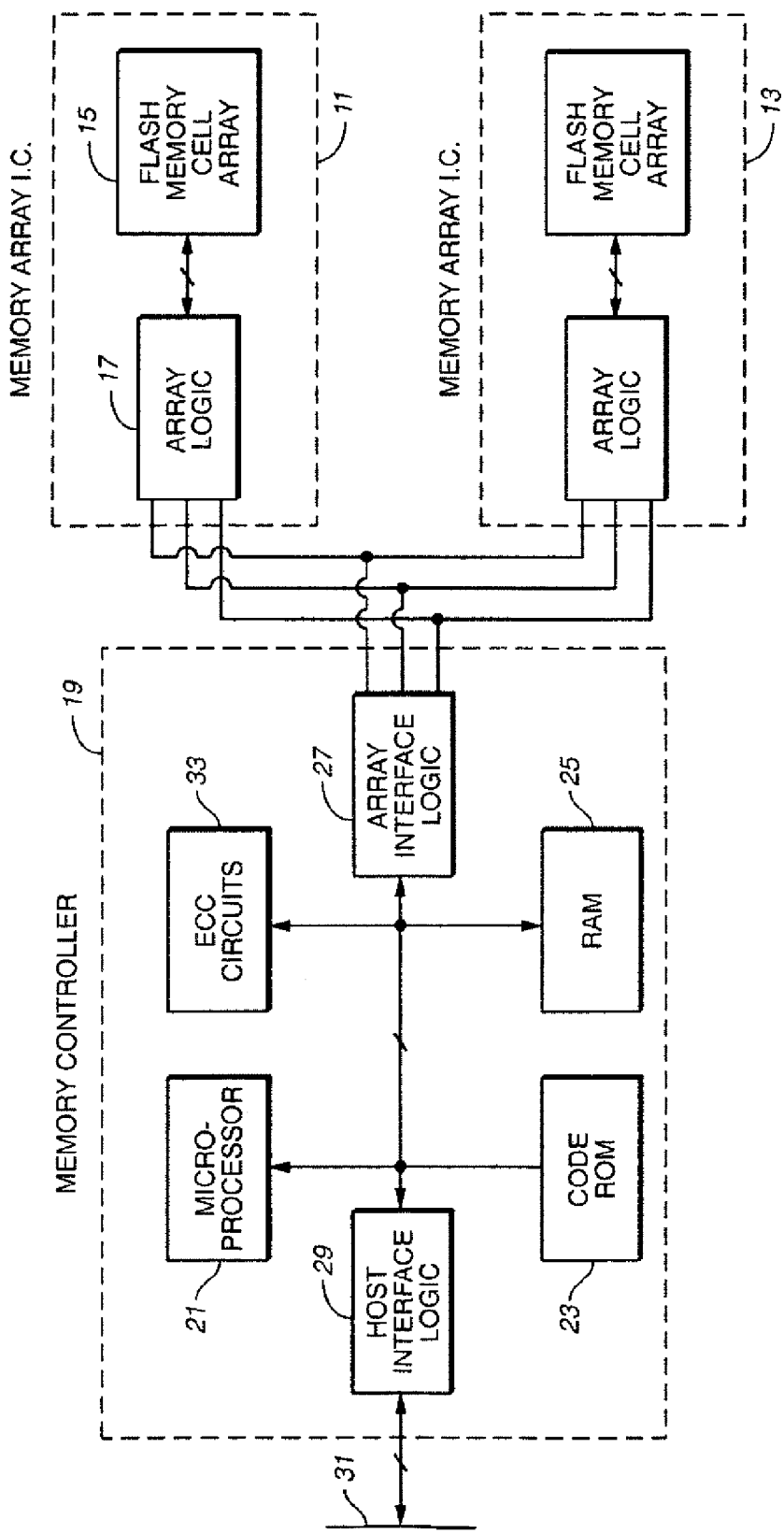
FIG. 1 illustrates schematically the main hardware components of a memory system suitable for implementing the present invention.

Referring initially to FIG. 1, a flash memory includes a memory cell array and a controller. In the example shown, two integrated circuit devices (chips) 11 and 13 include an array 15 of memory cells and various logic circuits 17. The logic circuits 17 interface with a controller 19 on a separate chip through data, command and status circuits, and also provide addressing, data transfer and sensing, and other support to the array 13. A number of memory array chips can be from one to many, depending upon the storage capacity provided. A memory cell array may be located on a single chip or may be comprised of memory cells on multiple chips. The controller and part or the entire array can alternatively be combined onto a single integrated circuit chip but this is currently not an economical alternative.

A typical controller 19 includes a microprocessor 21, a read-only-memory (ROM) 23 primarily to store firmware and a buffer memory (RAM) 25 primarily for the temporary storage of user data either being written to or read from the memory chips 11 and 13. Circuits 27 interface with the memory array chip(s) and circuits 29 interface with a host though connections 31. The integrity of data is in this example determined by calculating an ECC with circuits 33 dedicated to calculating the code. As user data is being transferred from the host to the flash memory array for storage, the circuit calculates an ECC from the data and the code is stored in the memory. When that user data are later read from the memory, they are again passed through the circuit 33, which calculates the ECC by the same algorithm and compares that code with the one calculated and stored with the data. If they compare, the integrity of the data is confirmed. If they differ, depending upon the specific ECC algorithm utilized, those bits in error, up to a number supported by the algorithm, can be identified and corrected.

The memory of FIG. 1 may be implemented as a small enclosed card containing the controller and all its memory array circuit devices in a form that is removably connectable with a host. That is, connections 31 allow a card to be disconnected and moved to another host, or replaced by connecting another card to the host. Alternatively, the memory array devices may be enclosed in a separate card that is electrically and mechanically connectable with a card containing the controller and connections 31. As a further alternative, the memory of FIG. 1 may be embedded within a host, wherein the connections 31 and 31' are permanently made. In this case, the memory is usually contained within an enclosure of the host along with other components.

Figure 2:
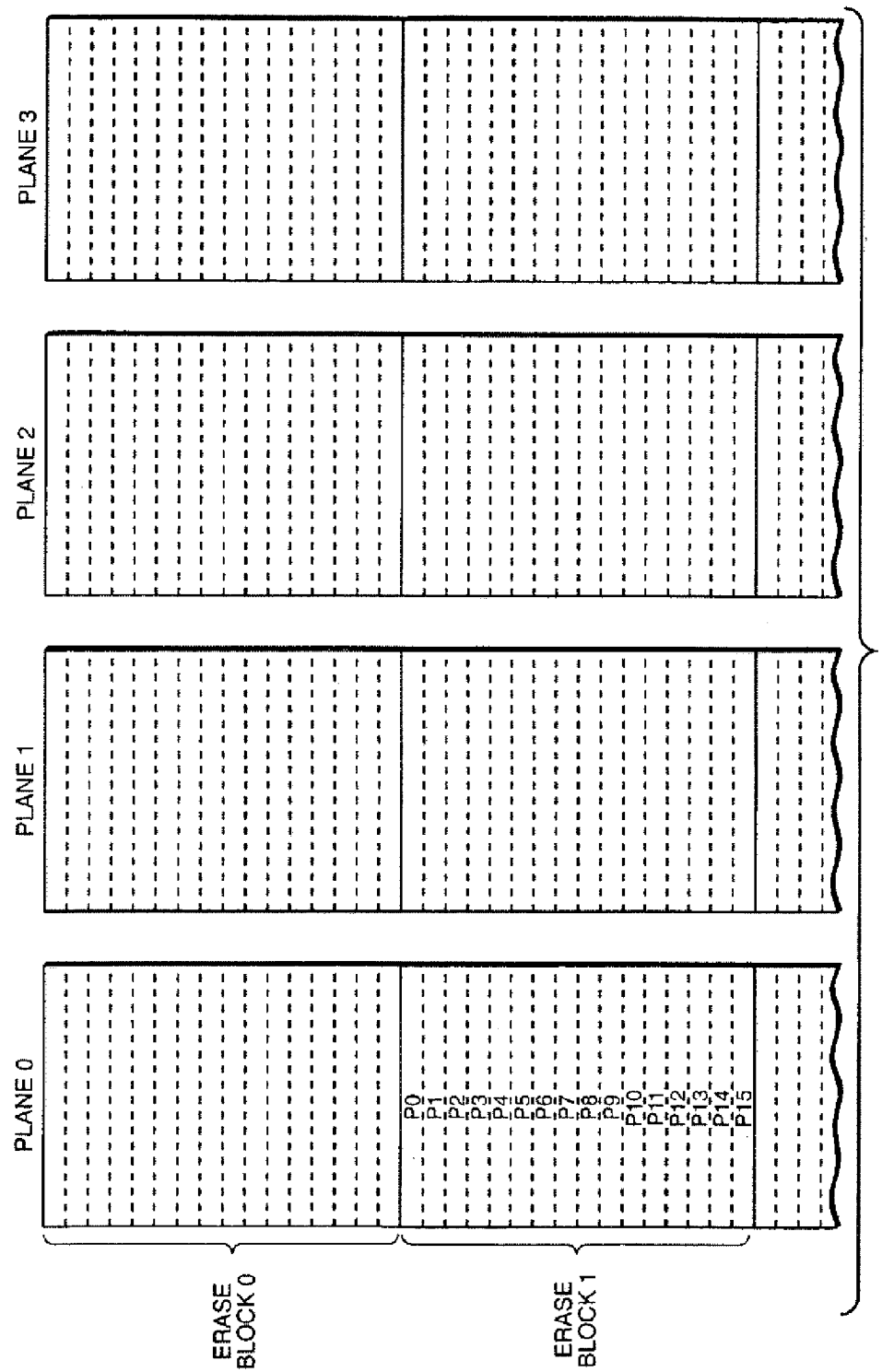
FIG. 2 illustrates a multi-plane memory array.

A portion of flash memory cell array 15 is shown in FIG. 2. Here, the memory cell array is physically divided into two or more planes, four planes 0-3 being illustrated. Each plane is a sub-array of memory cells that has its own data registers, sense amplifiers, addressing decoders and the like in order to be able to operate largely independently of the other planes. All the planes may be provided on a single integrated circuit device or on multiple devices, an example being to form each plane from one or more distinct integrated circuit devices. Each erase block in the example system of FIG. 2 contains 16 pages P0-P15, each page having a capacity of one, two or more host data sectors and some overhead data.

Figure 3:
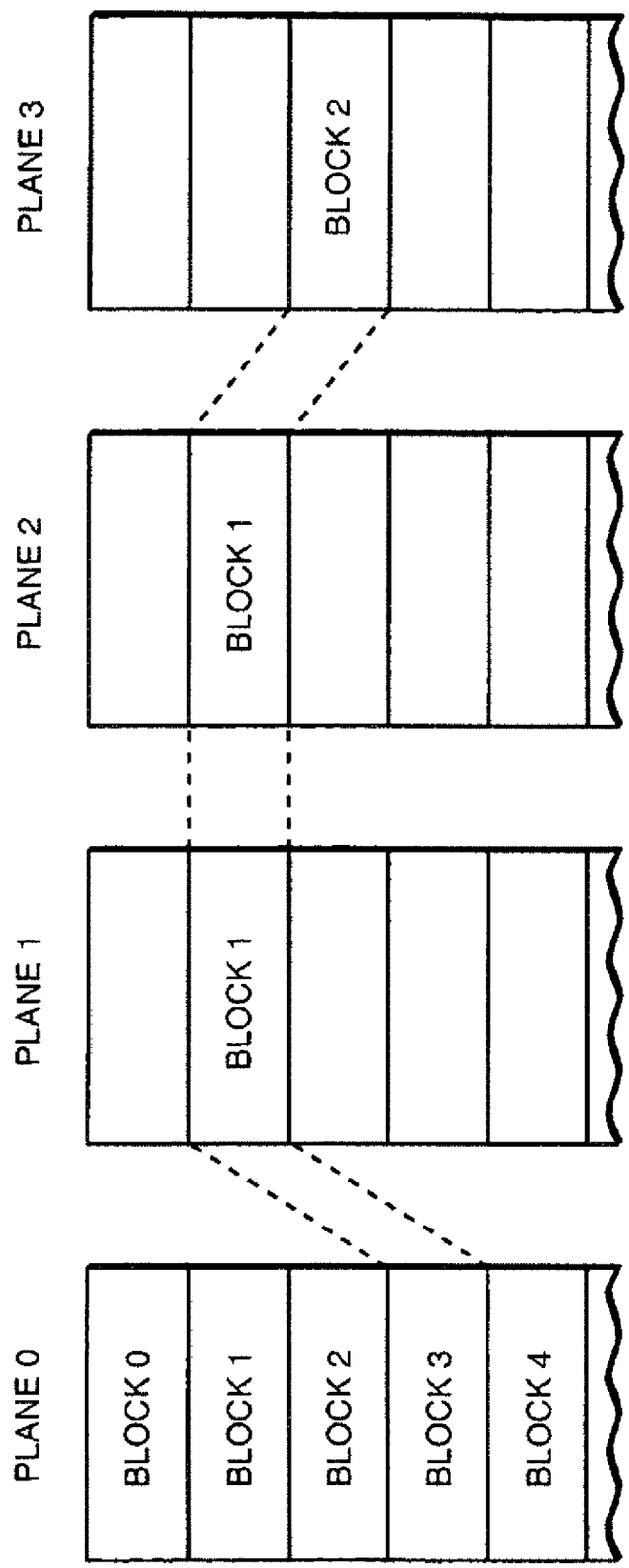
FIG. 3 illustrates formation of a metablock.

Another memory arrangement is illustrated in FIG. 3. Each plane contains a large number of erase blocks. In order to increase the degree of parallelism of operation, erase blocks within different planes are logically linked to form metablocks. One such metablock is illustrated in FIG. 3 by dashed lines showing logically linked blocks in different planes. Each metablock is logically addressable and the memory controller assigns and keeps track of the erase blocks that form the individual metablocks. The host system provides data in the form of a stream of sectors. This stream of sectors is divided into logical blocks. Here, a logical block is a logical unit of data that contains the same number of sectors of data as are contained in a metablock of the memory array. The memory controller maintains a record of the location where each logical block is stored. All blocks of the metablock are erased together, and pages from each block are generally programmed and read simultaneously.

In some examples, erase blocks are linked together to form metablocks in a static linking arrangement. For example, block 0 of each plane could be linked to form a metablock; block 1 of each plane could be similarly linked to form another metablock, etc. In other examples, erase blocks are linked together in dynamic manner so that different erase blocks may be linked at different times. Examples of such dynamic linking are provided in U.S. Pat. No. 7,433,993. While dynamic linking provides several advantages, it also presents certain problems.

One result of linking erase blocks dynamically is that erase blocks with very different characteristics may be linked. Where linking is static, a set of linked erase blocks such as a metablock all endure the same number of write-erase cycles and the same number of read or other operations. Because they all undergo the same wear patterns, they tend to have the same characteristics. When different erase blocks are linked at different times, two erase blocks with very different histories and very different characteristics may be linked, which may cause problems when accessing them in parallel.

In some cases, modified parameters are used to access an erase block as the erase block's characteristics change. For example, parameters used for reading, writing, and/or erasing may be modified based on the number of write-erase cycles ("hot count") and/or number of read operations. Carrying out such modification on a block-by-block basis presents particular challenges when accessing multiple erase blocks in parallel, in particular where such erase blocks are in different planes of the same memory die.

Figure 4A:
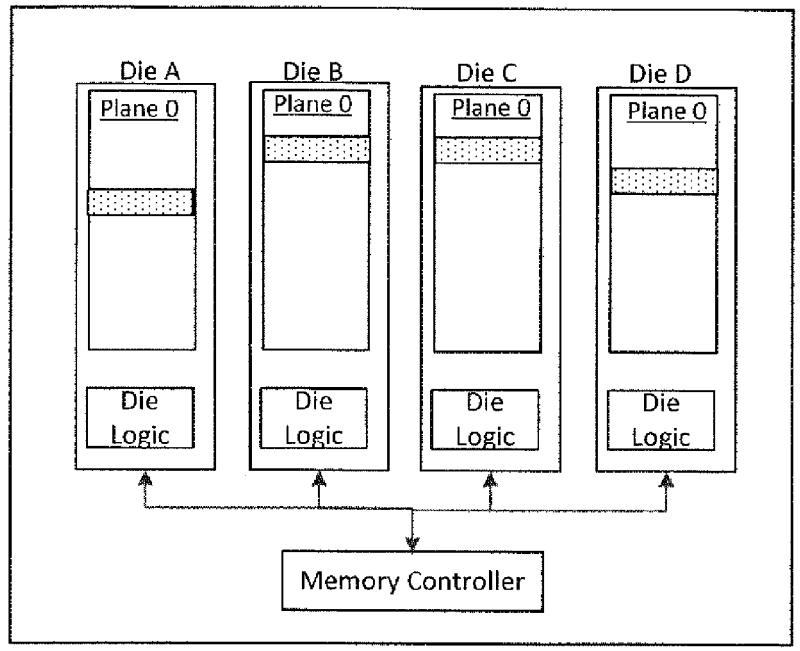
FIG. 4A illustrates a four-die memory array with one plane per die.

FIG. 4A shows the case of four planes, each in a different memory die. The shaded areas indicate particular erase blocks in each plane that are to be programmed in parallel. Because these erase blocks are dynamically linked, they do not have the same history, and have different programming parameters (e.g. programming voltages are different from erase block to erase block). Because each plane is in a different die, each has separate die logic circuits which allow parameters to be loaded and applied individually for each plane.

Figure 4B:
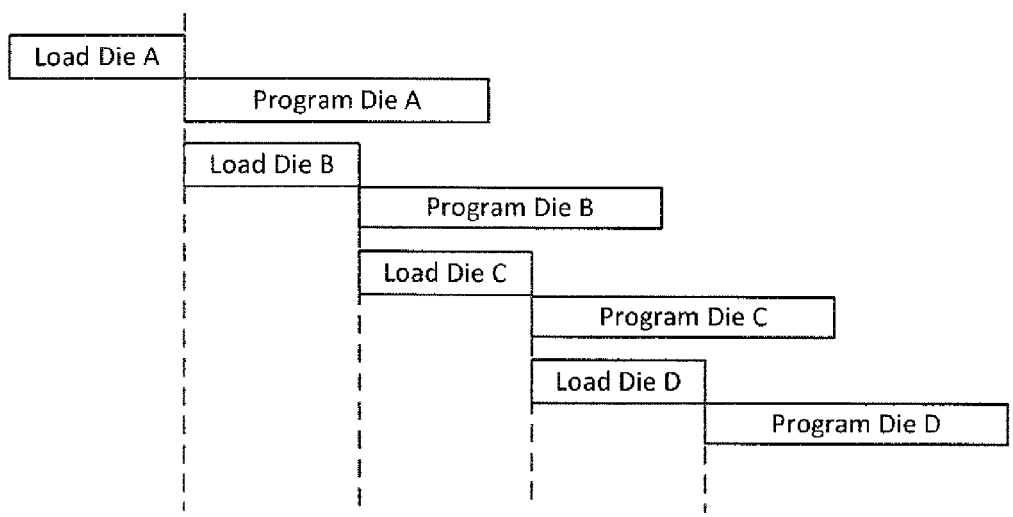
FIG. 4B is a timing diagram showing programming of the memory of FIG. 4A.

FIG. 4B shows how plane parameters may be individually modified and data may be programmed into the planes in parallel. First, parameters for the selected erase block of die A are loaded from the memory controller to the die logic which then uses the parameters to modify programming conditions for the selected erase block (e.g. change the program voltage from a default voltage to a modified voltage). Then, data to be programmed in die A is loaded (FIG. 4B shows a single time period "Load Die A" representing loading of parameters and subsequent loading of data). Programming the selected erase block is then performed in die A. While programming is performed in die A, parameters are loaded from the memory controller to the die logic in die B, which then uses the parameters to modify programming conditions. This may be a different modification to the modification in die A because of different history of the selected erase block. Data for die B is then loaded. While programming is performed in die B, parameters and data are loaded for die C. Similarly, while programming is performed in die C, parameters and data are loaded for die D. It will be understood that FIG. 4B is not to scale and that the time for programming is generally much longer than the time to load data and parameters.

Figure 5A:
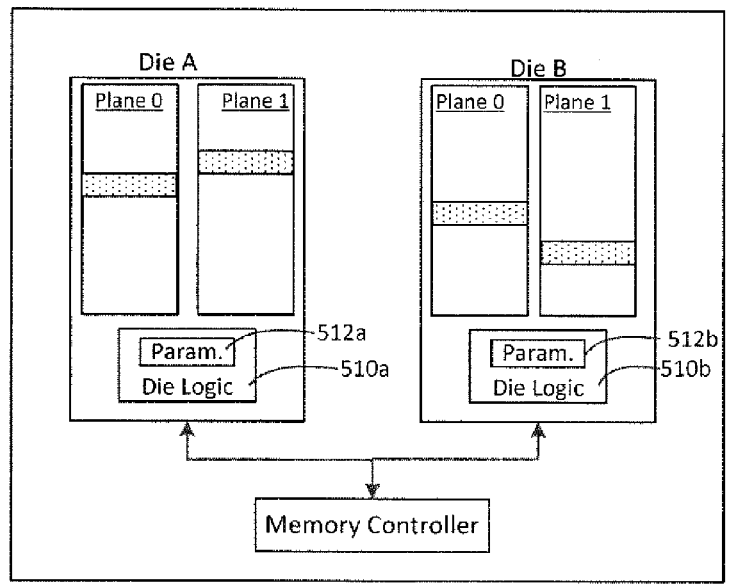
FIG. 5A illustrates a two die memory with two planes in each die.
Figure 5B:
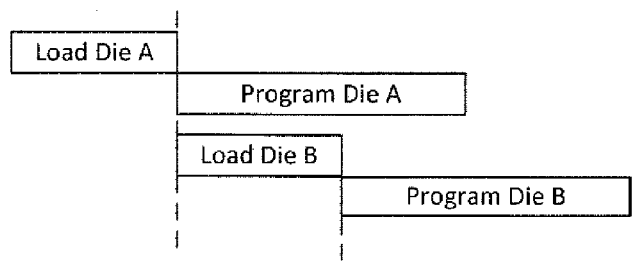
FIG. 5B is a timing diagram showing programming of the memory of FIG. 5A with the same parameters used for different planes of the same die.

FIG. 5A shows the case of two planes (plane 0, plane 1) in each of two dies (die A, die B). Die logic circuits 510a, 510b in each die receive and apply a set of parameters 512a, 512b for any given access operation. Where static linking is used within a die, each die just needs one set of parameters. Thus, as shown in FIG. 5B, parameters and data for die A are loaded, and programming of planes 0 and plane 1 of die A is performed. While programming is performed in die A, parameters and data are loaded for die B, and then programming of die B is performed in both plane 0 and plane 1 using the parameters.

In contrast to the static linking case, dynamically linked erase blocks within a die present certain problems. The same parameters may not be suitable for both planes because of the different histories of the erase blocks. If the same parameters are used for both planes, then reduced performance would be likely in at least one plane (parameters could only be optimized for one plane with the other plane having reduced performance).

Figure 5C:
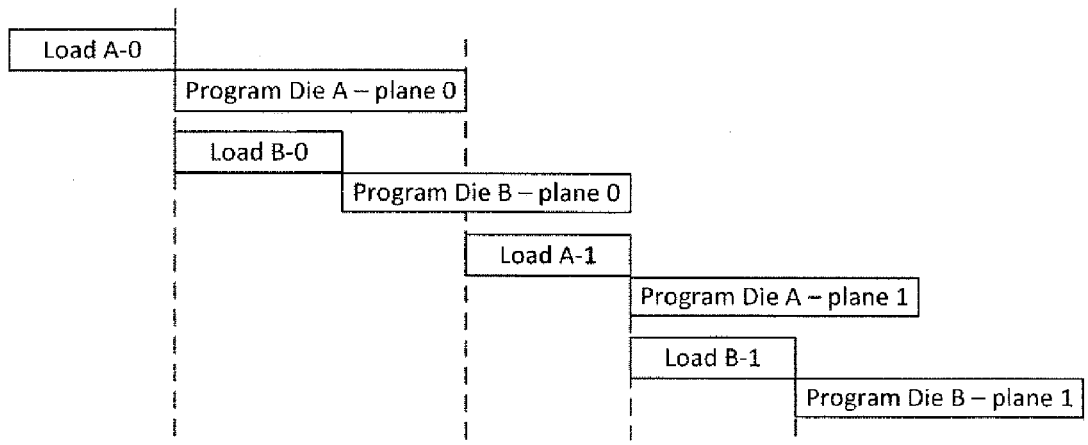
FIG. 5C is a timing diagram showing programming of the memory of FIG. 5A with different parameters used for different planes of the same die.

FIG. 5C shows one approach to such programming. First, appropriate parameters and data for die A, plane 0 are loaded. Then programming of die A, plane 0 is performed. While this programming is performed, parameters and data are loaded for die B, plane 0. Then programming of die B, plane 0 begins. The system then waits until completion of programming in die A (assertion of ready flag). When programming of die A, plane 0 is complete, parameters and data for die A, plane 1 are loaded to die logic for die A. Programming of die A, plane 1 is then performed using these parameters. When programming of die B, plane 0 is complete, parameters and data for die B, plane 1 are loaded to die logic for die B. Programming of die B, plane 1 is then performed. Because planes within a given die are programmed sequentially, not in parallel, this approach is not efficient and requires more than twice as long as a programming operation because of the sequential programming of planes within each die (i.e. time>2*Tprog, where Tprog is time for a programming operation). This is in contrast with the examples of FIGS. 4B and 5B which show substantially parallel programming of all planes with a total time that is little more than Tprog.

Figures 6A, 6B:
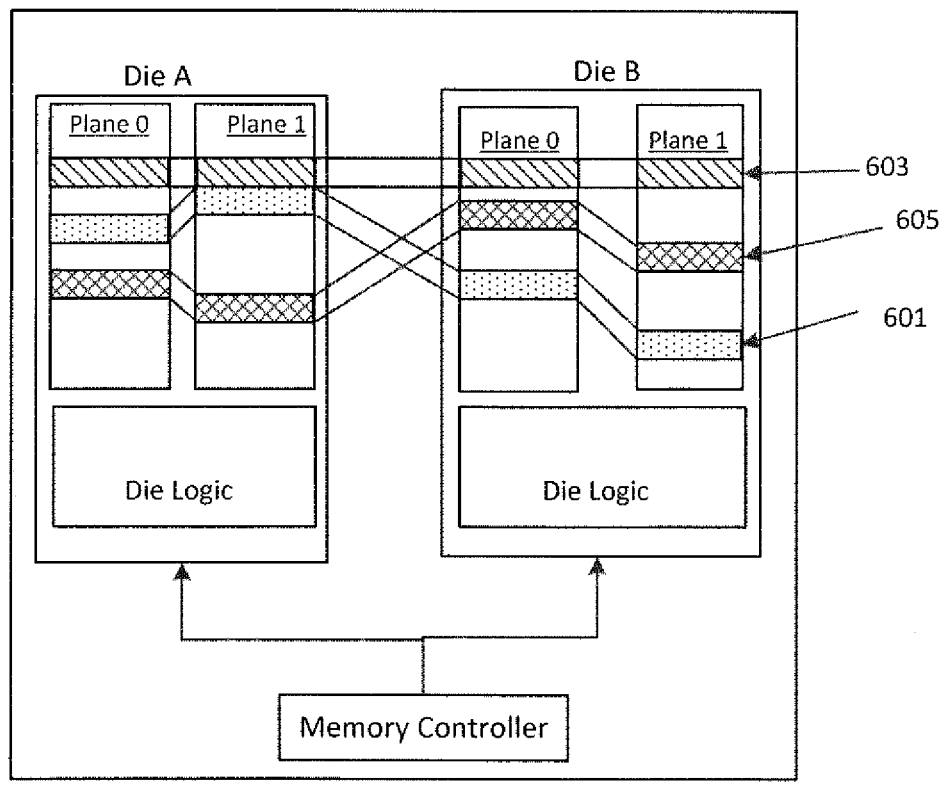
FIGS. 6A and 6B illustrate a system that allows dynamic block linking.

One way to deal with the problem of dynamic linking of blocks that require different parameters is to provide hardware that allows different parameters to be used for different planes in the same die. This allows parallel operation of two planes in the same die with different parameters. Examples of such operation are described in U.S. patent application Ser. No. 13/741,252 filed on Jan. 14, 2013. A memory controller sends parameters to the die logic of a particular die for each plane in the die that is to be programmed. The die logic then stores the parameters and makes appropriate modification to any accessing operation. For example, programming voltages may be modified differently so that plane 0 uses one programming voltage while plane 1 uses a different programming voltage during parallel programming. In other examples, other programming parameters such as the number of programming pulses may be different between planes in the same die. However, hardware is not always available for such separate FIGS. 6A and 6B illustrate a system that allows dynamic block linking to be efficiently performed across multiple planes. FIG. 6A shows various bins, or categories, in the first column. While just three bins are shown, any number of categories may be used. Each bin corresponds to a range of hot count values (second column, "Hot Ct") and all blocks with hot counts in the range are associated with the bin. For example, bin 1 contains blocks with an erase count between zero and A, where A may be any suitable value. In one example, the value of A is 5000 cycles for an SLC memory.

In another example, A may be between 500 and 1000 cycles for an MLC memory. Initially, all blocks are in bin 1 because they have a hot count value that is zero. As blocks go through write-erase cycles their hot count increases and when their hot counts exceed A they move to bin 2. Subsequently, as they experience further wear, they move to bin 3, etc.

A set of parameters that is suitable for reading, writing, and erasing new memory cells with less than A cycles may not be suitable for reading, writing, and erasing memory cells with more than A cycles. Accordingly, different sets of parameters may be used. The third column shows different sets of parameters that are associated with each bin. Parameter set 1 is associated with bin 1, parameter set 2 is associated with bin 2, and so on. As blocks become more worn, the parameters used to access them change so that they adapt to the changing characteristics of the blocks.

The fourth column in FIG. 6A shows different shading used to designate different categories in FIG. 6B. As can be seen in FIG. 6B, a set of blocks 601 from different planes in two different dies are linked for parallel operation. All the linked blocks are from the same bin (bin 2 in this example) so that all blocks can be accessed using the same set of parameters (parameter set 2 in this example). In another example a set of blocks 603 is selected for parallel operation from bin 1 (parallel operation using parameter set 1). In another example, a set of blocks 605 is selected from bin 3 (parallel operation using parameter set 3). By choosing only blocks from the same bin to be linked together, a single set of parameters can be used for parallel access to all blocks and allows all planes to be operated in parallel.

Figure 6C:
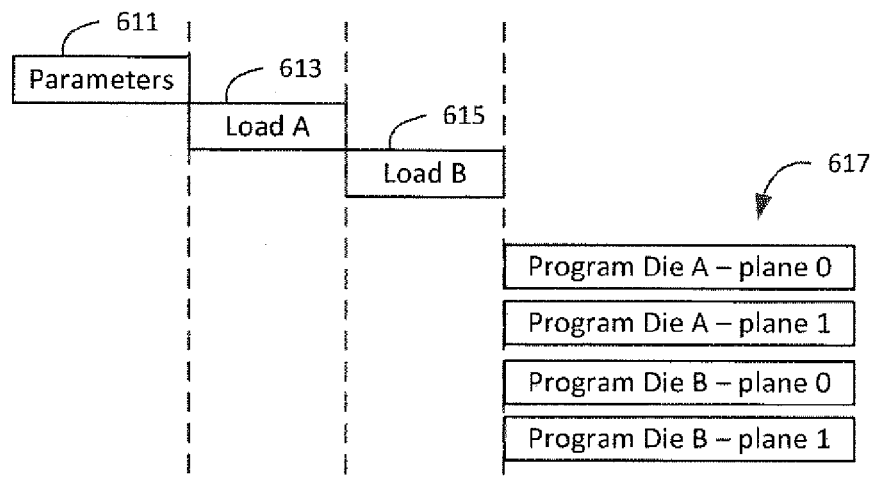
FIG. 6C is a timing diagram for parallel programming of the memory of FIG. 6B.

FIG. 6C shows a timing diagram for accessing linked erase blocks in parallel such as shown in FIG. 6B. In this example, accessing is programming data. Initially, blocks are selected from the same bin so that they have the same parameters, including the same programming parameters. The parameters are broadcast 611 to all planes in parallel so that there is some time saving as compared with sending individual parameters to individual planes sequentially. After the parameters are sent and loaded, the data is individually sent die and loaded in die A 613 and in die B 615. Then, all planes in all dies are programmed in parallel 617.

In order to link a set of blocks for parallel operation, it is necessary to find a category that has at least one block in each of the planes to be accessed. Initially, all blocks are in the lowest category so this generally straight forward. However, as the memory becomes worn, blocks may be spread over many categories and some categories may not have sufficient blocks for linking. For example, at some point, there may be no available blocks in category 1 (hot count below A) in at least one plane. Thus, in order to use maximum parallelism, blocks must be selected from a different category such as category 2. In one scheme, blocks are selected from the category with lowest hot count that has available blocks in each plane. This means that the least worn blocks are prioritized for subsequent use.

Figure 7:
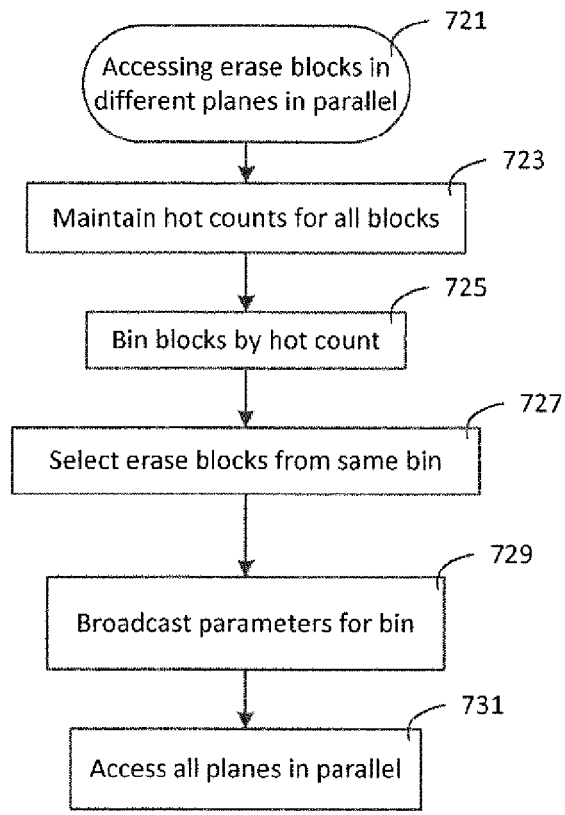
FIG. 7 illustrates a scheme for accessing planes in parallel using the same parameters.

FIG. 7 illustrates a scheme for accessing blocks in different planes in parallel 721. Write-erase cycle counts, or hot counts, are maintained for all blocks 723. Blocks are categorized, or binned, according to their hot counts 725, with each category or bin having an associated set of parameters that are adapted for blocks in the associated hot count range (i.e. adapted to the level of wear reflected by the hot count). When selecting blocks for parallel operation, for example when new data is to be stored in the memory array, blocks are selected from each plane that is to be accessed in parallel, selecting only blocks from the same category 727. In one example, this is the lowest category (category with lowest hot count values) that includes a block in each plane to be accessed. The appropriate parameters corresponding to the category of block being accessed and the type of access (e.g. category 2 programming parameters) are broadcast 729 to all planes being accessed. Then, all planes are accessed (e.g. programmed) in parallel 731.

While the above examples refer to a program operation that is directed to two planes within a die, aspects of the present invention are not limited to such examples. Aspects of the present invention may be applied to any number of planes in a die and may provide more time saving where a greater number of planes are accessed in parallel (as compared with time for serial access to the same number of planes).

While categorization, and thus access parameters for program, read, or erase operations may be modified on a block-by-block basis in response to the blocks' hot counts, this is not the only factor that may be used for categorization purposes. For example, in some cases data may be affected by a large number of read operations so that even though the hot count remains the same for a particular block the block may be recategorized based on a read count. Schemes for applying different parameters may also be based on locations of particular blocks within a memory array where there are known patterns in characteristics of blocks as a function of their locations. In other examples, experimentally observed differences between characteristics of different blocks may be used to categorize blocks without necessarily linking such individual parameters to any particular mechanism that might cause the differences. In some examples, a scheme for applying different parameters may be based on a combination of factors rather than a single factor, for example, based on location and hot count.

The terms "hot count" and "write-erase cycle count" are used synonymously throughout the present document. The terms "category" and "bin" are used synonymously.

CONCLUSION

The foregoing detailed description has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

It is claimed:

1. A method of operating erase blocks of a memory array in parallel comprising:
    maintaining individual write-erase cycle counts for erase blocks of a block-erasable flash memory array;
    categorizing the erase blocks into a plurality of categories according to their write-erase cycle counts, erase blocks in a category having write-erase cycle counts within a predetermined cycle court range that does not overlap a cycle count range of any other category of the plurality of categories;
    dynamically selecting individual erase blocks in different planes for parallel operation in metablocks such that each erase block in an individual metablock is selected from a common category such that each erase block in the individual metablock has a cycle count within a cycle count range associated with the common category that is distinct from other categories of the plurality of categories; and
    operating the individual metablock using a common set of parameters that is applied to all erase blocks of the metablock, the common set of parameters determined by the common category according to the associated cycle count range, with each category of the plurality of categories having a different set of parameters.

2. The method of claim 1 wherein the common set of parameters includes a programming voltage applied to a word line during programming.

3. The method of claim 1 wherein the common set of parameters includes a number of pulses of a programming voltage applied during programming.

4. The method of claim 1 wherein the common set of parameters includes a read voltage applied to a word line during reading.

5. The method of claim 1 wherein the individual erase blocks are selected from different planes in different dies.

6. The method of claim 5 further comprising broadcasting the common set of parameters to all of the different dies prior to accessing the metablock.

7. The method of claim 1 wherein the memory array is a Single-Level Cell (SLC) memory array and wherein the predetermined range of write-erase cycle counts for a category is less than ten thousand.

8. The method of claim wherein the memory array is a Multi-Level Cell (MLC) memory array and wherein the predetermined range of write-erase cycle counts for a category is less than two thousand.

9. A multi-plane flash memory comprising:
    a plurality of nonvolatile memory cells arranged in a plurality of planes, a plane comprising a plurality of erase blocks;
    a write-erase cycle count circuit that maintains an individual write-erase cycle count for individual erase blocks of each plane and categorizes the erase blocks into a plurality of non-overlapping categories according to their write-erase cycle count, each of the plurality of categories associated with a corresponding cycle count range;
    a dynamic linking circuit that links two or more erase blocks in two or more of the plurality of planes so that the two or more erase blocks that are linked together are from the same category so that the two or more erase blocks each have cycle counts in the same cycle count range associated with the category that is distinct from other categories of the plurality of categories; and
    a memory access circuit that accesses the two or more erase blocks in parallel using a common set of parameters for all of the two or more erase blocks, the common set of parameters associated with the category.

10. The multi-plane flash memory of claim 9 wherein the common set of parameters includes a programming voltage used during programming and a read voltage used during reading.

11. The multi-plane flash memory of claim 9 further comprising a plurality of lists of erase blocks, each list containing entries corresponding to the erase blocks of one of the categories.

12. The multi-plane flash memory of claim 9 wherein the plurality of nonvolatile memory cells are on a first chip and the write-erase cycle count circuit and the linking circuit are on a separate second chip.

13. The multi-plane flash memory of claim 9 wherein the plurality of nonvolatile memory cells are on a plurality of memory chips and the write erase cycle count circuit and the linking circuit are on a memory controller chip.

14. A method of operating a flash memory array, comprising:
- maintaining historical usage information for individual erase blocks in each of two or more dies of the memory array;
- dividing erase blocks into a plurality of classes according to their respective historical usage information so that erase blocks with levels of wear within a range are classed together, each of the plurality of classes associated with a corresponding range;
- operating the flash memory array using a plurality of different sets of memory access parameters, each set of memory access parameters associated with one of the classes;
- dynamically linking two or more individual erase blocks from different planes of the two or more dies for parallel operation as a metablock, all of the two or more individual erase blocks chosen from a selected class so that all of the two or more individual erase blocks having levels of wear within a range that is distinct from other classes of the plurality of classes; and
- accessing the metablock using the set of memory access parameters associated with the selected class.

15. The method of claim 14 wherein the selected class is selected as a result of containing erase blocks in each of the two or more dies, and containing erase blocks with less wear than any other class that also contains erase blocks in each of the two or more dies.

16. The method of claim 14 wherein historical usage information includes both write-erase cycle information and read cycle information.

* * * * *